United States Patent [19]

Clossen

[11] Patent Number: 4,695,039

[45] Date of Patent: Sep. 22, 1987

[54] BRACKET AND REPAIR METHOD

[76] Inventor: Kenneth Clossen, 7601 Belmount Ave., Cheyenne, Wyo. 82009

[21] Appl. No.: 803,139

[22] Filed: Dec. 2, 1985

[51] Int. Cl.[4] ............ H02G 1/00

[52] U.S. Cl. ............ 254/134.3 R

[58] Field of Search ............ 254/134.3 R, 134.3 PA; 174/40 R, 40 TD, 45 TD; 248/214, 215; 29/762

[56] References Cited

U.S. PATENT DOCUMENTS

| | | | |
|---|---|---|---|
| 345,020 | 7/1886 | Barney | 248/214 |
| 980,237 | 1/1911 | Fraser . | |
| 1,235,999 | 8/1917 | Neeley | 174/40 R X |
| 1,501,590 | 7/1924 | Floyd | 254/134.3 PA X |
| 1,940,162 | 12/1933 | Bodendieck | 254/100 X |
| 2,162,069 | 6/1939 | Dunaway et al. | 29/762 X |
| 2,430,451 | 11/1947 | Carr et al. | 254/134.3 PA X |
| 3,111,553 | 11/1963 | Bethea, Jr. | 254/134.3 R X |
| 3,127,114 | 3/1964 | Shaw | 248/214 X |
| 4,189,828 | 2/1980 | Chadwick | 29/762 |
| 4,312,495 | 1/1982 | Dunbar | 254/134.3 PA |

FOREIGN PATENT DOCUMENTS

| | | | |
|---|---|---|---|
| 1030137 | 4/1978 | Canada | 254/134.3 PA |
| 905242 | 1/1954 | Fed. Rep. of Germany | 248/214 |
| 91924 | 3/1959 | Netherlands | 248/214 |
| 936135 | 6/1982 | U.S.S.R. | 254/134.3 R |

OTHER PUBLICATIONS

"Hi-Tension News", vol. 24, No. 2, Feb. 1955, Ohio Brass Company, Mansfield, Ohio.

*Primary Examiner*—Frederick R. Schmidt
*Assistant Examiner*—Steven P. Schad
*Attorney, Agent, or Firm*—Dean P. Edmundson

[57] ABSTRACT

A bracket, support system and method are described for temporarily supporting electrical conductor lines on towers so as to enable repairs or modifications to the suspension system for the conductor lines. The bracket comprises a C-shaped tool having two elongated arms carried by a body portion. The tool retained on and supported by the hinged gate on a tower while tensioning means is connected between the bracket and the electrical conductor lines. When the tensioning means is tightened or shortened, the bracket supports the lines so that repairs or modifications to the suspension system can be made.

6 Claims, 3 Drawing Figures

BRACKET AND REPAIR METHOD

FIELD OF THE INVENTION

This invention relates to high voltage electrical transmission lines. More particularly, this invention relates to techniques for repairing or modifying the connections between high tension electrical conductor lines and the towers which support such lines. More specifically, this invention relates to techniques and apparatus for repairing or modifying the connections of the electrical conductor lines to the towers without taking down the lines.

BACKGROUND OF THE INVENTION

High voltage electrical transmission lines are common place for moving electricity from a generating plant to a desired location where electricity is needed. Such electrical transmission lines comprise thick electrical conductor lines which are suspended from high metal towers. Large insulators are connected at one end to the conductor lines and at the other end to the tower or to a hinged gate carried by the tower.

The large transmission lines pass over all types of terrain. The tension on the conductor lines is typically 7,000 to 10,000 pounds in order to keep the lines well supported above the ground between the spaced towers. When the transmission line changes direction the conductors place a significant sidewise force on the towers. When the conductor lines are attached to insulators carried by hinged gates on the tower the hinged gates sometimes allow the conductor lines to hang too close to the tower structure itself.

In such cases it is often necessary to re-hang the lines so that they are not suspended too close to the tower structure. Although it is possible to repair or make modifications to the conductor line suspension system by taking down the conductor lines, this is extremely undesirable because of the expense associated with taking down the conductor lines and because of the lost revenue resulting from having the transmission line inoperative for an extended period of time. Sometimes it is possible to use large cranes to support the conductor lines when making repairs to the suspension system, but this requires use of very expensive equipment, and oftentimes it is not possible to maneuver such large equipment to the required site because of rough terrain. Also, these large towers are constructed to support high tension conductor lines on both sides of the tower. Consequently, if the conductor lines are disconnected from one side of the tower there is presented a danger of the entire tower being pulled over or collapsed due to the tension on the opposite side of the tower. If one such tower collapses it is possible that adjacent towers may also collapse due to the force exerted by the high tension conductor lines.

Thus, making repairs or modifications to the suspension system on these large towers has been a difficult, delicate and expensive undertaking.

SUMMARY OF THE PRESENT INVENTION

In accordance with the present invention there is provided a relatively simple and effective technique for supporting electrical conductor lines on towers so as to enable repairs or modifications to the suspension system for the conductor lines. The invention also provides a novel bracket which enables the technique to be utilized without taking down the conductor lines and without danger of collapsing the tower during the operation.

The novel bracket comprises a C-shaped tool having a generally planar body portion and two elongated arms carried by the body portion. The angle between the arms is generally in the range of about 30° to 40°. The bracket is adapted to engage and be supported by a gate member on the tower. Each arm includes attachment means (e.g., an aperture) to which tensioning means may be attached. The other end of the tensioning means is attached to one of the electrical conductor lines.

Thus, an electrical conductor line can be attached to each arm of the bracket. Upon pulling the lines closer to the bracket, the normal suspension system (e.g., insulators) is loosened and may be repaired or replaced, as required.

There is no need to use heavy cranes to support the conductor lines nor is it necessary to take the lines down in order to make repairs or modifications to the suspension system on the tower. Furthermore, the technique of the invention is safe and does not change the torque or force exerted on the tower by the conductor lines. Accordingly, the danger of collapsing a tower during repair is avoided.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
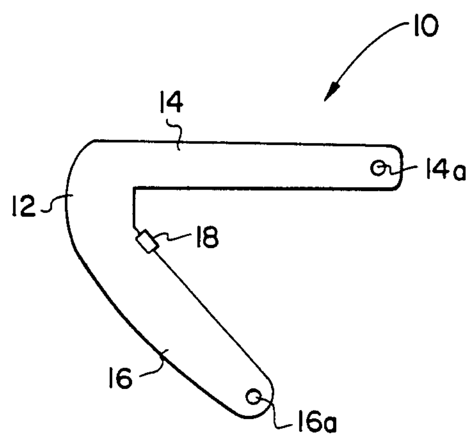
FIG. 1 is an elevational view of one embodiment of C-shaped bracket useful in the techniques of this invention.
Figure 2:
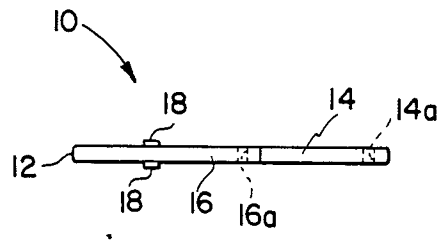
FIG. 2 is an edge view of the bracket shown in FIG. 1.

In FIGS. 1 and 2 there is shown a C-shaped bracket 10 of the invention having a generally planar body portion 12 and elongated arms 14 and 16 carried by the body portion. The angle between arms 14 and 16 is typically less than 90° and preferably is in the range of about 30° to 40°, with 35° being most preferred.

Near the outer end of each arm is an aperture, **14*a* and 16*a* respectively, which serves as attachment means. That is, after the bracket has been placed in proper position on the hinged gate on a tower (shown in FIG. 3**) there may be attached to each end of the bracket a tensioning means, as more specifically described hereinafter. Other types of attachment means may also be used, if desired, so long as the attachment means is able to withstand the large pulling force associated with use of the bracket in the technique of this invention.

Preferably the arms are integral with the body portion, i.e., the arms and the body portion are formed as a single unit. A preferred material from which to make the bracket is aluminum (e.g., an aluminum alloy commonly known as 7075 which has been given a conventional heat treatment T-651). The thickness of the body portion and the arms is typically about 0.75 inch.

The tensile strength of the bracket must be at least 10,000 pounds, and is preferably 30,000 pounds, and more preferably is 60,000 pounds. The force exerted on a tower by high tension electrical conductor lines can sometimes reach close to 10,000 pounds. Thus, it is preferred for the bracket to be able to withstand forces much greater than that so there is an adequate margin for safety.

The bracket may be made of any material which is capable of withstanding the forces involved in the techniques and methods of this invention. For example, steel may be used, although aluminum is lighter and can be made sufficiently strong for the techniques involved here.

The length of the arms may vary, for example from about 30 to 50 inches. A preferred and convenient length is about 40 to 48 inches, however, with a length of about 46 inches being most preferred.

Preferably one of the arms forms a 90° angle with the body portion. This is shown in FIG. 1. The reason for this is apparent in FIG. 3 where bracket 10 is supported on corner piece 20 of hinged gate 30 on tower 40. Corner piece 20 has a horizontal top edge and a 90° outer corner. Bracket 10 is adapted to rest upon and be supported by corner piece 20 when being used. Of course, if the shape or configuration of corner piece 20 should be different, then the bracket 10 may also be changed so as to conform to the edge configuration of the corner piece. The intent is to have the bracket rest firmly and stably on the corner piece during use.

If desired, there may also be included tabs 18 on one of the arms of the bracket to serve as alignment means. That is, the tabs may assist in keeping the bracket in alignment with the plane of the corner piece 20.

Figure 3:
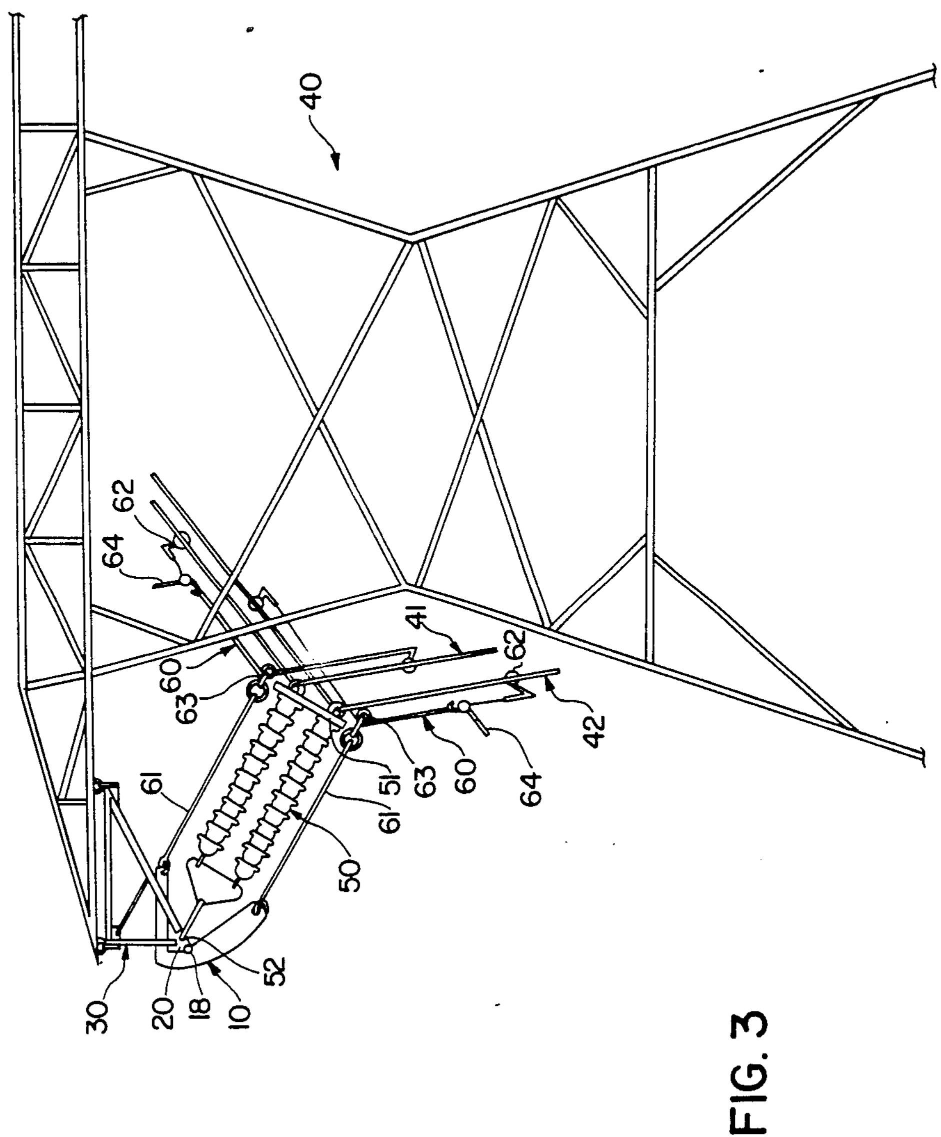
FIG. 3 the use of the bracket of FIG. 1 in temporarily supporting electrical conductor lines on a tower so that repairs to the suspension system can be made safely.

In FIG. 3 the use of the bracket 10 is illustrated. Tower 40 is generally of the type used to support multiple high voltage electrical transmission conductors. For sake of simplicity only two such conductor lines 41 and 42 are shown, although normally there are many more lines suspended from a single tower.

In this illustration the force or tension exerted by the conductor lines 41 and 42, coupled with the considerable length of suspension system 50, has enabled the conductor lines to be too close to the structure of the tower itself. For example, arcing may occur between the conductor lines and the tower. To correct this situation it is necessary to replace suspension system 50 with some other suspension means which holds the conductor lines farther away from the structure of the tower 40.

In order to replace, repair or modify the suspension means, however, it is necessary to disconnect the conductor lines 41 and 42 from end 51 of suspension means 50. The opposite end 52 of suspension means 50 is secured to corner piece 20 of hinged gate 30. The design of the hinged gate 30 is such that the only portion of it which is intended for supporting the force exerted by the conductor lines is corner piece 20. If an attempt is made to support the conductor lines by any other portion of the gate or the tower structure, the torque exerted on the tower structure by the high tension conductor lines may be sufficiently different from what was intended that the tower could collapse.

The technique of the present invention enables suspension means 50 to be disconnected from the conductor lines without changing the torque on the tower and without creating a danger of the tower collapsing. First, the bracket 10 is positioned on to corner piece 20 in the manner shown so that it rests firmly and stably on corner piece 20. Then slings 60 are attached to each conductor line, by means of grips 62. Nylon straps 61 are each connected or attached at one end to an arm of bracket 10 and are attached at the opposite end to a sling 60 by means of snatch blocks 63, as illustrated. Each snatch block 63 includes a pulley and a side opening to receive sling 60. Ratchets 64 then are used to shorten the length of slings 60 in a manner such that tension is placed on each arm of the bracket 10 equally. When the conductor lines have been pulled toward bracket 10 a sufficient distance, suspension means 50 may be disconnected, repaired, modified, etc. while bracket 10 supports the weight of the conductor lines totally.

Using the techniques of this invention, the force exerted on corner piece 20 of gate 30 remains the same at all times. No holes need be drilled in the structure to support the bracket, nor is it necessary to remove any portion of the original tower structure. The technique of this invention enables the conductor lines to be moved away from the structure of the tower (e.g., by dead ending the conductor lines at corner piece 20).

Other variants are possible without departing from the scope of this invention.

What is claimed is:

1. A method for temporarily supporting high tension electrical conductor lines which are suspended by means of a suspension system from a gate member on a tower in a manner such that repairs to, or replacement of, said suspension system may be performed, said method comprising the steps of:

(a) providing a C-shaped bracket comprising a generally planar body portion and two elongated arms carried by said body portion, wherein each said arm includes attachment means, wherein said arms are integral with said body portion; wherein each said arm has a length in the range of about 40 to 48 inches; wherein one said arm forms a 90° angle with said body portion; and wherein said bracket is adapted to withstand at least 60,000 pounds of force applied to said arms;

(b) supporting said bracket on said gate member in a manner such that said arms project toward said electrical conductor lines;

(c) connecting one of said electrical conductor lines to each said arm of said bracket by means of tensioning means having first and second ends, wherein said first end of said tensioning means is connected to one arm of said bracket by means of said attachment means, and wherein said second end of said tensioning means is connected to one of said electrical conductor lines;

(d) pulling said electrical conductor lines toward said bracket by means of said tensioning means sufficiently to enable said suspension system to be disconnected and removed from said electrical conductor lines while said lines are retained and supported by said bracket; whereby said suspension system may be repaired or replaced.

2. A method in accordance with claim 1, wherein each said tensioning means comprises a sling which includes rachet means, wherein said ratchet means is adapted to shorten the length of said sling.

3. A method in accordance with claim 2, wherein each said slign is shortened in a manner such that the tension on each said electrical conductor line remains equal.

4. A support system useful for temporarily supporting and retaining high tension electrical conductor lines, which are normally connected to a hinged hanger on a tower by suspension means, so as to enable repairs to, or replacement of, said suspension means, said support system comprising:

(a) a C-shaped bracket comprising a generally planar body portion and two elongated arms carried by said body portion, wherein each said arm includes attachment means, wherein said body portion is adapted to engage and be supported by said hinged hanger on said tower; wherein each said arm has a length in the range of about 40 to 48 inches; wherein one said arm forms a 90° angle with said body portions; and wherein said bracket is adapted to withstand at least 60,000 pounds of force applied to said arms;

(b) tensioning means adapted to be attached to said attachment means on each said arm and to said electrical conductor lines, wherein said tensioning means is adapted to pull said electrical conductor lines toward said bracket sufficiently to enable said suspension system to be disconnected and removed from said electrical conductor lines while said lines are retained and supported by said bracket.

5. A support system in accordance with claim 4, wherein said bracket comprises aluminum.

6. A support system in accordance with claim 4, wherein one said arm of said bracket includes a pair of tabs which extend past the edge of said arm for aligning said bracket with said hanger.

* * * * *